(12) United States Patent
Sofer et al.

(10) Patent No.: US 9,154,959 B2
(45) Date of Patent: Oct. 6, 2015

(54) SYSTEMS AND METHODS FOR SECURING NEAR FIELD COMMUNICATIONS

(71) Applicants: Sergey Sofer, Rishon Lezion (IL); Shahar Wolf, Haifa (IL)

(72) Inventors: Sergey Sofer, Rishon Lezion (IL); Shahar Wolf, Haifa (IL)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 14/135,875

(22) Filed: Dec. 20, 2013

(65) Prior Publication Data

US 2015/0181435 A1  Jun. 25, 2015

(51) Int. Cl.
*H04B 5/00* (2006.01)
*H04W 12/12* (2009.01)
*H04B 7/24* (2006.01)

(52) U.S. Cl.
CPC ............. *H04W 12/12* (2013.01); *H04B 5/0031* (2013.01)

(58) Field of Classification Search
CPC .............. G06K 7/00; G06K 19/0723; G06K 19/07749; H04W 12/00; H04W 12/12
USPC .............................. 455/41.1–41.3, 410–411; 340/10.1–10.6, 539.26, 572.1
See application file for complete search history.

(56) References Cited

U.S. PATENT DOCUMENTS 7,202,784 B1 * 4/2007 Herwig .................. 340/568.1
2007/0177738 A1 * 8/2007 Diorio et al. ............... 380/270
2009/0267747 A1 * 10/2009 Rivest et al. .............. 340/10.51

* cited by examiner

*Primary Examiner* — Lee Nguyen
(74) *Attorney, Agent, or Firm* — Sutherland Asbill & Brennan LLP

(57) ABSTRACT

Systems and methods to secure near field communications (NFC) are disclosed. An NFC polling device may detect a change in voltage when attempting to communicate with another NFC device and based at least in part on the magnitude of the change in voltage if there is an attempted hacking and/or snooping event. The NFC polling device may further identify the number of modulation voltage levels detected and determine if there is an attempted hacking event based on the number of modulation voltage levels detected.

23 Claims, 5 Drawing Sheets

SYSTEMS AND METHODS FOR SECURING NEAR FIELD COMMUNICATIONS

TECHNICAL FIELD

This disclosure generally relates to systems and methods for securing near field communications.

BACKGROUND

Near Field Communications (NFC) is a relatively short range communications protocol that uses electro-magnetic (EM) fields for data transfer. In some cases, the NFC protocol may be defined by the NFC forum or other suitable standards bodies. NFC technology may be incorporated into user devices, such as smart phones and tablet computing devices, or smart cards. Using NFC technology, users may be able to conveniently transfer information from one user device to another by simply tapping the two devices or bringing the two devices in close proximity, such as a few inches. NFC devices, when transferring information, may not be configured to detect hacking and/or snooping attempts, particularly at a physical level.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Figure 1:
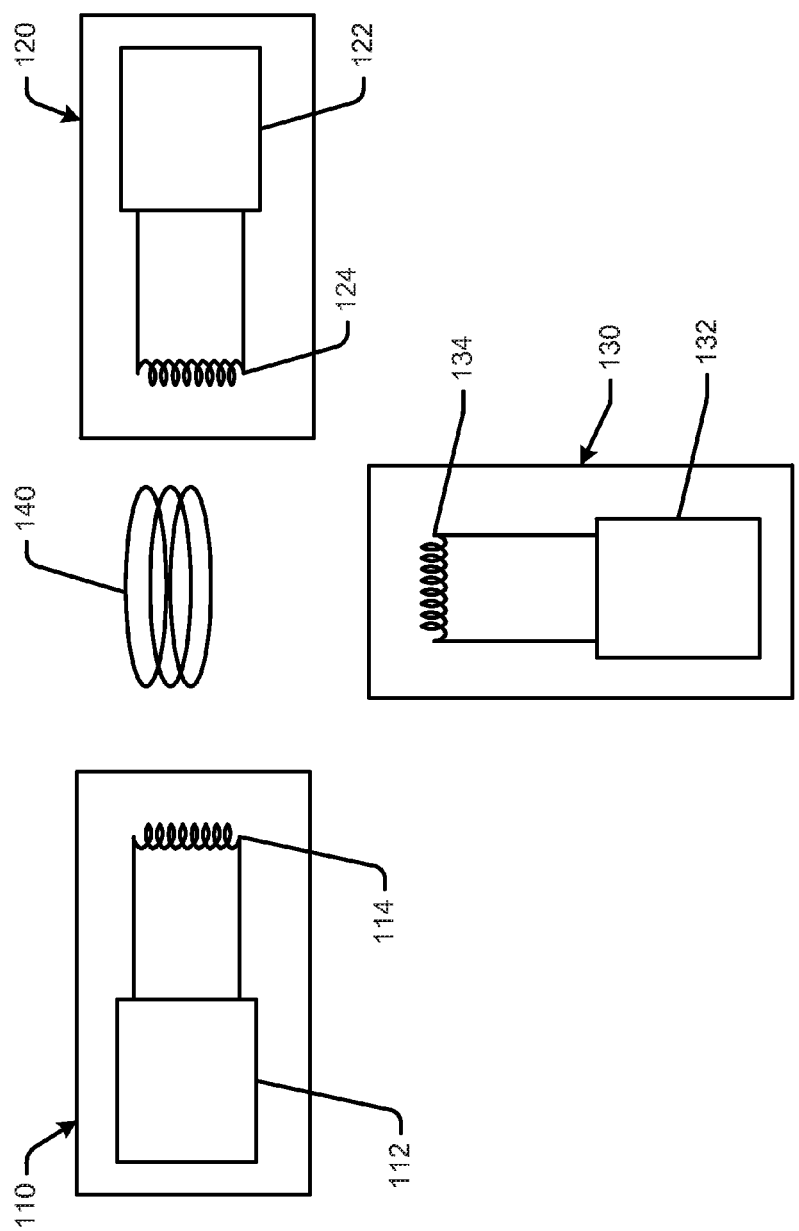
FIG. 1 is a simplified schematic diagram of an example environment with attempted communications between two near field communications (NFC) devices between an NFC polling device and an NFC listening device with a hacking attempt by a third NFC hacking device, in accordance with example embodiments of the disclosure.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like, but not necessarily the same or identical, elements throughout.

Embodiments of the disclosure may provide systems, apparatus, and methods for detecting hacking attempts during information transfer via near field communications (NFC). In example embodiments, an NFC polling device may be configured to detect that more than one other NFC device, such as a listening device and a hacking device, may be loading the electric field emitted by the polling device at the same time. These example embodiments may entail the polling device detecting the loading of the emitted electric field that is outside of a threshold condition and identifying a hacking attempt based thereon. For example, the NFC polling device may detect, under normal circumstances (i.e. without a hacking and/or snooping condition), when the emitted electric field is loaded and/or modulated by a single reading device by detecting a voltage sensed on a sensing element of the polling device that is within an expected voltage range. In other words, the voltage change sensed at the sensing element of the NFC polling device, if outside of an expected voltage range characteristic of a single NFC listening device, then the NFC polling device may identify that a hacking attempt is occurring. Therefore, if the magnitude of the voltage change is greater than a predetermined threshold level, then it may be determined by the polling device that a hacking attempt is underway.

In further example embodiments, the NFC polling device may be configured to determine that a hacking attempt is underway by monitoring the levels of voltage change sensed by the NFC polling device. The NFC polling device, when receiving communications from a single NFC listening device may detect two different voltage levels. These two different voltage levels may result from the reading device modulating the electric field emitted by and detected by the NFC polling device. In other words, the NFC polling device may modulate a load presented in the electric field detected by the polling device to provide two different logic levels corresponding to a logic high level and a logic low level. However, if a second NFC device, such as another NFC listening device or an NFC hacking device is present in the electric field emitted by and detected by the NFC polling device, then there may be more than two different voltage levels detected by the polling device. In example embodiments of the disclosure, the NFC polling device may be configured to detect a hacking and/or snooping attempt based at least in part on the number of different voltage levels detected by the NFC polling device. In example embodiments, the NFC polling device may determine that hacking attempt is in progress if more than two voltage levels are detected using the sensing element of the NFC polling device.

It will be appreciated that the mechanism described herein may be used to secure NFC-based communications at a physical layer. In other words, securing NFC communications and preventing hacking attempts, in accordance with example embodiments of the disclosure may be performed at a direct point-to-point data connection, rather than higher level abstraction layers. The analog signal associated with the communication between the NFC polling device and the NFC listening device and possibly an NFC hacking device, as detected by the sensing element of the NFC polling device, may be used to identify any potential hacking attempts. Therefore, example embodiments of the disclosure may make use of pre-established electrical and physical specifications and/or threshold levels associated with the data connection between the NFC polling device and the NFC listening device to establish a relatively secure communicative connection therebetween.

In example embodiments, the NFC polling device, upon detecting a hacking attempt may discontinue communications with the NFC listening device. Therefore, any hacking attempt may be thwarted once detected. In some cases, the NFC polling device may discontinue reading and/or sensing the electric field emitted by the NFC polling device. In example embodiments, the NFC polling device may report any hacking attempt to other hardware and/or software components, such as applications that may be executed on any user device that incorporates the NFC polling device.

FIG. 1 is a simplified schematic diagram of an example environment 100 with attempted communications between an NFC polling device 110 and an NFC listening device 120 with a hacking attempt by a NFC hacking device 130, in accordance with example embodiments of the disclosure. The NFC polling device 110 may also be referred to as an NFC reader device 110, NFC interrogator device, and/or NFC master device 110. The NFC polling device 110 may also be referred to without the "NFC," simply as polling device 110, interrogator device 110, reader device 110, and/or master device 110. The NFC listening device 120 may also be referred to as an NFC writer device 120, NFC tag 120, and/or NFC slave device 120. The NFC listening device 120 may also be referred to without the "NFC," simply as listening device 120, writer device 120, tag 120, and/or slave device 120.

It will be appreciated that one or more of the NFC polling device 110, the NFC listening device 120, and/or the NFC hacking device 130 may be incorporated into a user device (not shown) or be a stand-alone device. The user device, as used herein, may be any variety of client devices, electronic devices, communications devices, and/or mobile devices. The user device may include, but is not limited to, tablet computing devices, electronic book (ebook) readers, netbook computers, notebook computers, laptop computers, desktop computers, Ultrabook™, personal digital assistants (PDA), smart phones, web-enabled televisions, video game consoles, set top boxes (STB), or the like. It should further be noted that the user devices that may incorporate NFC technology (e.g. may include an NFC polling device 110 or NFC listening device 120) may be configured to control NFC infrastructure associated therewith to communicate using NFC protocols, as established by the NFC forum. In some cases, the NFC polling device 110 may operate according to protocols that have not been specified by the NFC forum. In some example embodiments, the systems and methods as disclosed herein may be applicable to communications standards other than NFC based communications. It should be noted that the user devices incorporating NFC infrastructure may further be configured to communicate via protocols other than NFC. These protocols may include any suitable communication formats and/or protocols including, but not limited to, Wi-Fi, direct Wi-Fi, Bluetooth, 3G mobile communication, 4G mobile communication, long-term evolution (LTE), WiMax, direct satellite communications, or combinations thereof.

In other example cases, one or more of the NFC polling device 110, the NFC listening device 120, and/or the NFC hacking device 130 may be incorporated into a smart card. A smart card may include integrated circuits that may facilitate processing applications and storing data for use in identifying the smart card and/or a user of the smart card. A smart card may also be referred to as a chip card or an integrated circuit card (ICC) and may be sized such that it may fit within a user's wallet or pocket. An example type of smart card may include a contactless smart card that may include NFC infrastructure, such as an antenna connected to a main chip in the smart card that may facilitate wireless communication (e.g., via NFC) between the smart card and a destination device. Another example type of a smart card may include a contact smart card, which may require contact with a destination device to enable information to be transmitted to the destination device.

The NFC polling device 110 may include an electromagnetic (EM) field emitter (not shown) that may be configured to emit an EM field 140. The EM field, in some example embodiments, may have a frequency of 13.56 Megahertz (MHz). The NFC polling device 110 may further include circuitry 112 for polling and reading signals transmitted to the NFC polling device 110 and a sensing element 114 for detecting any changes in the intensity of the EM field 140. The changes in the EM field 140 that may be sensed by the sensing element 114 and/or interpreted by the circuitry 112 may be due to modulating of the EM field 140 by one or more of the listening device 120 and/or the hacking device 130. Although the sensing element 114 is depicted here as a coil, it may be any suitable geometry, such as a loop geometry where the sensing element 114 operates as a loop antenna. In some example cases, the sensing element 114, in addition to sensing, may be used for the purposes of emitting and/or generating the EM field 140. It will further be appreciated that the polling device 110 may be configured to transmit data by modulating, such as by amplitude modulation (AM) of the carrier signal (i.e. the 13.56 MHz signal) of the EM field 140.

The NFC listening device 120 may include circuitry 122 for communicating via the EM field 140. This communications may be performed by modulating the EM field 140, as emitted by the polling device 110. The EM field 140 may be modulated by the NFC listening device 120 by presenting a load 124, such as an inductive coil, where the backscatter of the load 124 may be modulated by the circuitry 122 according to the data to be transmitted via the EM field 140 to the NFC polling device 110. In other words, NFC listening device 120 may be configured to vary the magnitude of the load 124 to modulate the level of energy of the EM field 140 dissipated by the load 124 and thereby modulate the EM field 140. As described above, the NFC polling device 110 may be configured to detect the modulation of the EM field 140 by the NFC listening device 120 using its sensing element 114 and may further be configured to demodulate the transmitted data using the circuitry 112. Therefore, it will be appreciated that the NFC listening device 120 and the NFC polling device 110 may be configured to be inductively coupled via the EM field 140.

In example embodiments, the NFC polling device 110 may be configured to detect a voltage across the sensing element 114 resulting from the EM field 140. In one sense, the carrier signal of the EM field 140 may induce a current to flow in the sensing element 114 that may be detected as a voltage across terminals of the sensing element 114. During normal operations where there is no hacking attempt, the NFC listening device 120 and/or the NFC polling device 110 may be the only devices that are attempting to modulate the EM field 140 and/or detect signals carried by the EM field 140. The NFC listening device 120 may present its load 124 on the EM field 140 that may be detected by the NFC polling device 110 as a change in voltage across the sensing element 110 of the NFC polling device 110. This change in the voltage across the sensing element 114, resulting from the NFC listening device 120 presenting itself in EM field 140 may be detected by the circuit 112 of the NFC polling device 110. For example, in some embodiments, the magnitude of the voltage change detected by the NFC polling device 110 when the NFC listening device 120 is introduced into the EM field may be approximately 0.3 volts. Therefore, if the NFC polling device 110 and the sensing element 114 and circuit 114 thereon detect a change in voltage of approximately 0.3 volts, then the NFC polling device 110 may be configured to identify that there may be in an NFC listening device 120 within communicative proximity of the NFC polling device.

In the case where there may be a second device, in addition to the listening device 120, presented to the EM field 140, such as the snooping or hacking NFC device 130, then the change in voltage, as detected by the NFC polling device 110 across its sensing element 114 may be greater than the voltage change resulting from only the listening device 120 presenting itself to the EM field 140. In example embodiments, a magnitude of voltage change sensed by the NFC polling device 110 across the sensing element 114 may be greater than a threshold value and based thereon, the NFC polling device 110 may be configured to identify an attempted hacking event. In some example cases, the threshold voltage change level may be less than twice the voltage change expected from a single NFC listening device 120 introduced to the EM field 140.

In some example embodiments, the NFC polling device 110 may be configured to identify distinct levels of modulation of the EM field as detected by the NFC polling device 110 as a voltage across the sensing element 114 of the NFC polling device 110. The NFC polling device 110 may be configured to generate a time series of voltages corresponding to sample points where the EM field 140 is sensed by the sensing element 114 and tabulated by the circuitry 112. The time series of voltages may include various levels of voltages representing different modulation levels. For example, in a communication between the NFC polling device 110 and a single NFC listening device 120, there may be two distinct modulation levels to represent a logic high level and a logic low level. Therefore in communication between two NFC devices, such as the NFC polling device 110 and the NFC listening device 120, the NFC polling device 110 may detect only two distinct voltage levels corresponding to the two logic levels of a binary bit.

In the case where there may be a second device, in addition to the NFC listening device 120, presented to the EM field 140, such as the snooping or hacking NFC device 130, then the NFC listening device 120 and the NFC hacking device 130 may both attempt to modulate a signal onto the EM field 140. In this case, the NFC polling device 110 may detect more than two voltage levels instead of just two voltage levels across the sensing element 114. Responsive to detecting more than two modulation levels, the NFC polling device 110 may determine that there may be a hacking attempt.

In example embodiments, the NFC polling device 110, upon detecting a hacking attempt may be configured to discontinue communications with the NFC listening device 120. Therefore, any hacking attempt may be thwarted once detected. In some cases, the NFC polling device 110 may be configured to discontinue reading and/or sensing the EM field 140 emitted by the NFC polling device 110. In example embodiments, the NFC polling device 110 may be configured to report any hacking attempt to other hardware and/or software components, such as applications that may be executed on any user device that incorporates the NFC polling device 110. In some further example embodiments, the NFC polling device 110 may be configured to discontinue emitting the EM field 140, responsive to detecting an attempted hacking event.

Figure 2A:
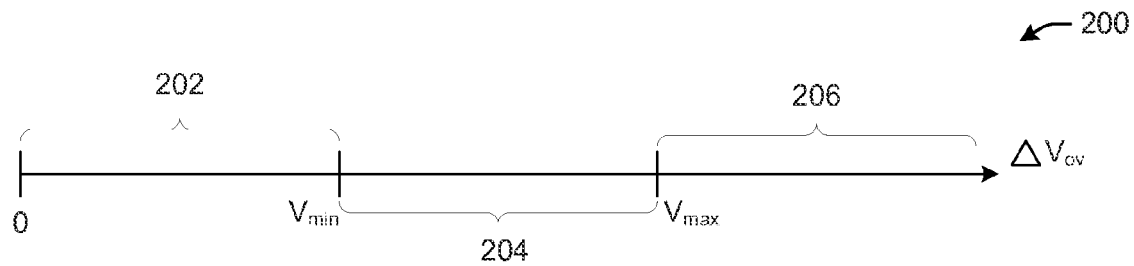
FIG. 2A is a simplified graph illustrating example voltage change levels sensed by the NFC polling device when reading the NFC listening device, in accordance with example embodiments of the disclosure.
Figure 2B:
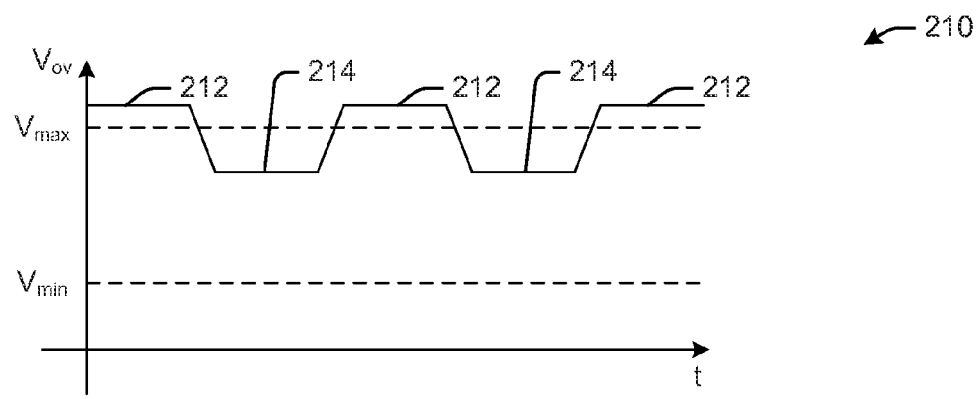
FIG. 2B is a simplified graph illustrating example voltage change level thresholds associated with the NFC polling device reading the NFC listening device, in accordance with example embodiments of the disclosure.
Figure 2C:
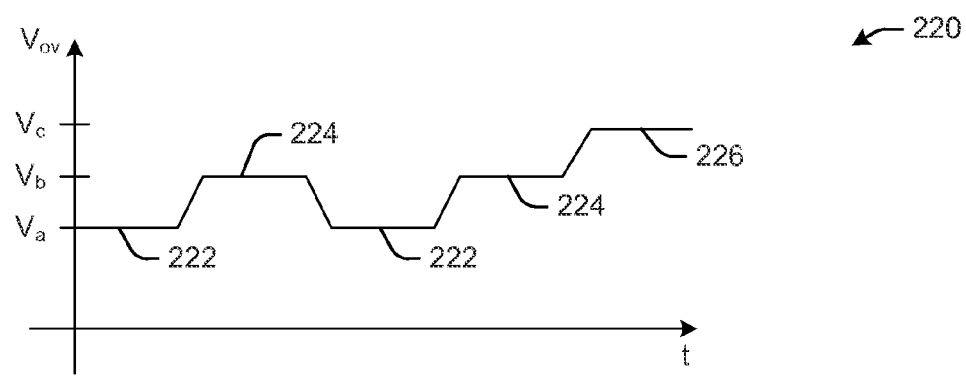
FIG. 2C is a simplified graph illustrating example voltage change levels during a detected hacking attempt, in accordance with example embodiments of the disclosure.

The voltage levels detected by the NFC polling device 110 may be better understood with reference to FIGS. 2A, 2B, and 2C. FIG. 2A is a simplified graph illustrating example voltage change levels 200 sensed by the NFC polling device 110 when reading the NFC listening device 120, in accordance with example embodiments of the disclosure. In this example, the voltage change range 202 between zero and $V_{min}$, as detected at the sensing element 114, may represent a level where the NFC polling device 110 does not detect any NFC listening device 120 within the EM field 140 (i.e. within communicative proximity of NFC mechanisms). In other words, there may not be any NFC devices attempting to communicate with the polling device 110 when the voltage is in range of 202. At voltage change range 204, between $V_{min}$ and $V_{max}$ the sensing element of the NFC polling device 110 may detect a voltage change that indicates that a single NFC listening device 120 may be loading the EM field 140 and wishing to communicate with the NFC polling device 110. At voltage range 206, the voltage change detected by the NFC polling device 110 may be indicative of more than a single NFC listening device 120 loading the EM field 140. This change in voltage may indicate to the NFC polling device 110 that there may be a snooping and/or hacking attempt underway. At that point, the NFC polling device 110 may be configured to stop communications with any NFC devices that may be present in the EM field. Therefore, if the NFC polling device 110 detects that the magnitude of the change in voltage is greater than a predetermined threshold, then the NFC polling device 110 may be configured to determine that there is an attempted hacking event.

FIG. 2B is a simplified graph illustrating example voltage change level 210 and thresholds associated with the NFC polling device 110 reading the NFC listening device 120, in accordance with example embodiments of the disclosure. When a listening device 120 is present in the EM field and attempting to communicate with the polling device 110, there may be two modulation levels of a high modulation level 212 and a low modulation level 214. Furthermore, $V_{min}$ may be the lowest allowable voltage change detected by the NFC polling device 110 to identify that there is a listening device in the EM field 140 emitted by the NFC polling device 110. $V_{max}$ on the other hand, may be an upper bound allowable voltage change. In other words, $V_{max}$ may serve as the threshold level, beyond (i.e. above) which the NFC polling device 110 and the circuit 112 thereon may deem the signal detected at the sensing element to be indicative of a hacking attempt. In this example, the high modulation level 212 is above $V_{max}$. Therefore, the NFC polling device 110 may determine that the detected voltage change 210 indicates a hacking attempt. Responsive to determining that the detected voltage change may be indicative of a hacking attempt, the NFC polling device 110 may be configured to report the hacking attempt, discontinue communicating via the EM field 140, and/or discontinue emitting the EM field 140.

FIG. 2C is a simplified graph illustrating example voltage change levels 220 during a detected hacking attempt, in accordance with example embodiments of the disclosure. In this depiction, there may be three distinct levels at which the EM field 140 is modulated by an NFC listening device 120 and NFC hacking device 130. Since a single device, such as a single NFC listening device 120, may modulate the EM field 140 to yield two different voltage change levels at the sensing element 114, when three separate voltage change levels 222, 224, 226 are detected, the NFC polling device 110 may be configured to identify that there are more than one NFC devices presented to the EM field 140 for communication with the NFC polling device 110. In this way the NFC polling device 110 may be configured to identify that a hacking and/or snooping attempt may be underway. Responsive to determining that the detected voltage change may be indicative of a hacking attempt, the NFC polling device 110 may be configured to report the hacking attempt, discontinue communicating via the EM field 140, and/or discontinue emitting the EM field 140.

Figure 3:
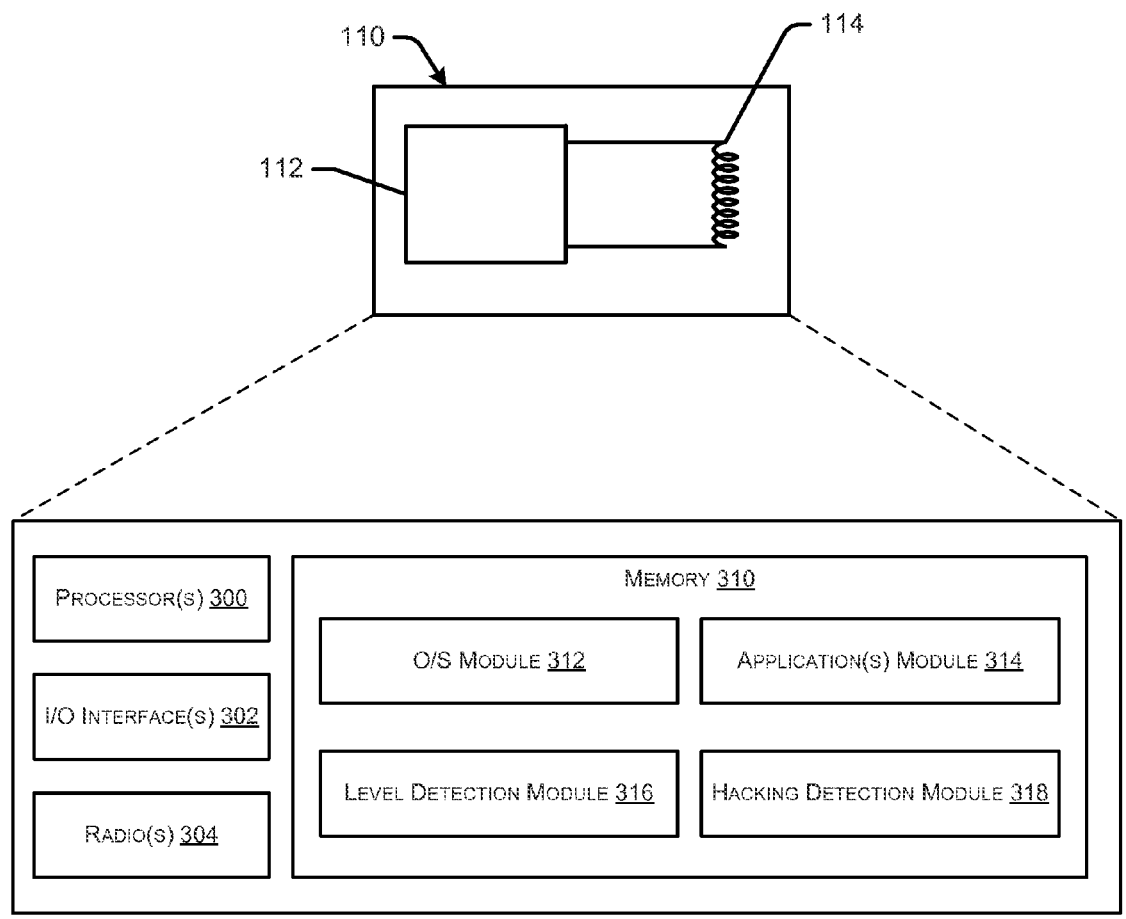
FIG. 3 is a simplified block diagram illustrating an example architecture of the NFC polling devices that are configured to detect a hacking attempt during communications, in accordance with example embodiments of the disclosure.

FIG. 3 is a simplified block diagram illustrating an example architecture of NFC polling devices 110 that are configured to detect a hacking attempt during communications, in accordance with example embodiments of the disclosure. The NFC polling device 110 may include one or more processor(s) 300 input/output (I/O) interface(s) 302, a radio 304, and memory 310.

The processors 300 of the NFC polling devices 110 may be implemented as appropriate in hardware, software, firmware, or combinations thereof. Software or firmware implementations of the processors 300 may include computer-executable or machine-executable instructions written in any suitable programming language to perform the various functions described. Hardware implementations of the processors 300 may be configured to execute computer-executable or machine-executable instructions to perform the various functions described. In example embodiments, the processors 300 may be configured to execute instructions, software, and/or applications stored in the memory 310. The one or more processors 300 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The NFC polling devices 110 may also include a chipset (not shown) for controlling communications between one or more processors 300 and one or more of the other components of the NFC polling devices 110. The processors 300 may also include one or more application specific integrated circuits (ASICs) or application specific standard products (ASSPs) for handling specific data processing functions or tasks. In certain embodiments, the NFC polling devices 110 may be based on an Intel® Architecture system and the one or more processors 300 and chipset may be from a family of Intel® processors and chipsets, such as the Intel® Atom® processor family.

The one or more I/O device interfaces 302 may enable the NFC polling device 110 to interact with a user device in which the NFC polling device 110 may be incorporated. In example embodiments, the NFC polling device 110 may be configured to provide, via the I/O interfaces 302, the data and/or communications, or indications thereof, by an NFC mechanism, such as with an NFC listening device 120 to a user device in which the NFC polling device 110 may be incorporated. In this way the user device may be able to receive information and/or data form the NFC polling device 110 for functionality and/or application that are being executed on the user device.

The transmit/receive or radio 304 may include any suitable radio for transmitting and/or receiving radio frequency (RF) signals in the bandwidth and/or channels corresponding to the communications protocols utilized by the NFC polling device 110 to communicate with other NFC devices, such as the listening device 120. The radio component 304 may include hardware and/or software to modulate communications signals according to pre-established transmission protocols, such as those established by the NFC forum. The radio component 304 may include any known receiver and baseband suitable for communicating via the communications protocols of the NFC polling device 110. The radio component may further include a low noise amplifier (LNA), additional signal amplifiers, an analog-to-digital (A/D) converter, one or more buffers, and digital baseband. In some example embodiments, the radio 304 may be configured to modulate the NFC carrier signal with a frequency of 13.56 MHz with a data rate of one of 106 kilobits per second (kbps), 212 kbps, or 424 kbps.

The memory 310 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 310 may store program instructions that are loadable and executable on the processor(s) 300, as well as data generated or received during the execution of these programs. The memory 310 may have stored thereon software modules including an operating system (O/S) module 312, applications module 314, level detection module 316, and hacking detection module 318. Each of the modules and/or software stored on the memory 310 may provide functionality for the NFC polling device 110, when executed by the processors 300.

The O/S module 312 may have one or more operating systems stored thereon. The processors 300 may be configured to access and execute one or more operating systems stored in the (O/S) module 312 to operate the system functions of the NFC polling device 110. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 314 may contain instructions and/or applications thereon that may be executed by the processors 300 to provide one or more functionality associated with the NFC polling device 110, including functions related to communicating via NFC protocols. These instructions and/or applications may, in certain aspects, interact with the (O/S) module 312 and/or other modules of the NFC polling device 110. The applications module 314 may have instructions, software, and/or code stored thereon that may be launched and/or executed by the processors 300 to execute one or more applications and functionality associated therewith. These applications may include general purpose functionality, as well as functionality associated with NFC-based communications.

The level detection module 316 may have instructions stored thereon that, when executed by the processors 300, enable the NFC polling device 110 to provide a variety of sensing and level detection functionality. The processors 300 may be configured to direct the measurement of and receive a time series of voltage samples corresponding to the emitted EM field 140 that may be modulated by an NFC listening device 120. The processors 300 may further be configured to determine one or more voltage levels associated with the time series of voltages measured by the NFC polling device 110. For example, the NFC polling device 110 and the processors 300 thereon may be configured to determine a voltage level associated with the time series of voltage for the purposes of being able to compare that voltage level to a threshold level. Furthermore, the processors 300 may be configured to determine distinct voltage levels in the time series of voltage samples as sensed by the sensing element 114 of the NFC polling device 110. In other words, the processors 300 may be configured to distinguish between various modulation levels of data and/or bits carried on the carrier signal of the EM field 140. In example embodiments, the processors 300 may be able to distinguish between voltage levels within the time series of voltage samples by comparing any differences in voltage between two data points to a predetermined threshold level gap. In other words, the processors 300 may be configured to identify a separate voltage level only if the difference in voltage between two points in time are substantial enough. Determination of whether the difference between the two points of time are substantial enough, may be performed by comparing the voltage difference between the two points in time to a predetermined threshold gap. Further still, the processors 300 may be configured to generate a set of voltage change levels of the time series of detected voltages at the sensing element 114 of the NFC polling device 110.

The hacking detection module 318 may have instructions stored thereon that, when executed by the processors 300, enable the NFC polling device 110 to provide a variety of functionality associated with detecting a hacking attempt in communications with the NFC polling device 110. In one aspect, the processors 300 may be configured to compare a magnitude of a voltage change detected at the sensing element 114 of the NFC polling device 110 to a threshold value. If the magnitude of the voltage change is greater than the threshold value, then the processors may be configured to identify that there may be more than one NFC device loading the EM field 140 and, therefore, there may be a potential hacking attempt.

The processors 300, by further executing instructions stored in the hacking detection module 318, may be configured to determine the cardinality of the set of voltage change levels or the number of distinct levels of voltages detected by the sensing element 114 and recorded in the time series of the voltage data. If the cardinality of the set of voltage change levels is greater than a predetermined threshold, then the processors may be configured to determine that there may be an attempted hacking event. In other words, if there are more than an expected number of voltage change levels, representing modulated bit values on the EM field 140, then that may be an indication that there are more than an expected number of NFC devices interacting with the EM field 140 and, in that case, there may be a relatively high risk of hacking and/or snooping. In some example embodiments, the predetermined threshold number of voltage levels may be two. That means that in the processors 300 detect three or more distinct voltage levels, then the processors 300 may be configured to identify the detection of three or more voltage levels as a potential hacking attempt and/or an attempted hacking event.

In some example embodiments, responsive to determining an attempted hacking condition and/or potential hacking, the processors 300 may be configured, in certain example embodiments, to discontinue emitting the EM field 140. In other example embodiments, the processors 300 may be configured to discontinue communicating via NFC protocols upon detecting a hacking attempt. In yet further example embodiments, the processors 300 may be configured to report the occurrence of the hacking attempt to one or more other entities and/or processes associated with the NFC polling device 110, such as a user device in which the NFC polling device 110 may be embedded. In still further example embodiments, the NFC polling device 110 and the processors 300 thereon may be configured to wait a predetermined period of time after a hacking attempt has been identified and then configured to reengage in communicating via NFC protocol to determine if the hacking threat still exists. If the hacking threat is no longer present, then the NFC polling device 110 may continue communicating with a NFC listening device 120.

It will be appreciated that there may be overlap in the functionality of the instructions stored in the operating system (O/S) module 312, the applications module 314, the level detection module 316, and the hacking detection module 318. In fact, the functions of the aforementioned modules 312, 314, 316, 318 may interact and cooperate seamlessly under the framework of the NFC polling device 110. Indeed, each of the functions described for any of the modules 312, 314, 316, 318 may be stored in any module 312, 314, 316, 318 in accordance with certain embodiments of the disclosure. Furthermore, in certain embodiments, there may be one single module that includes the instructions, programs, and/or applications described within the operating system (O/S) module 312, the applications module 314, the level detection module 316, and the hacking detection module 318.

Figure 4:
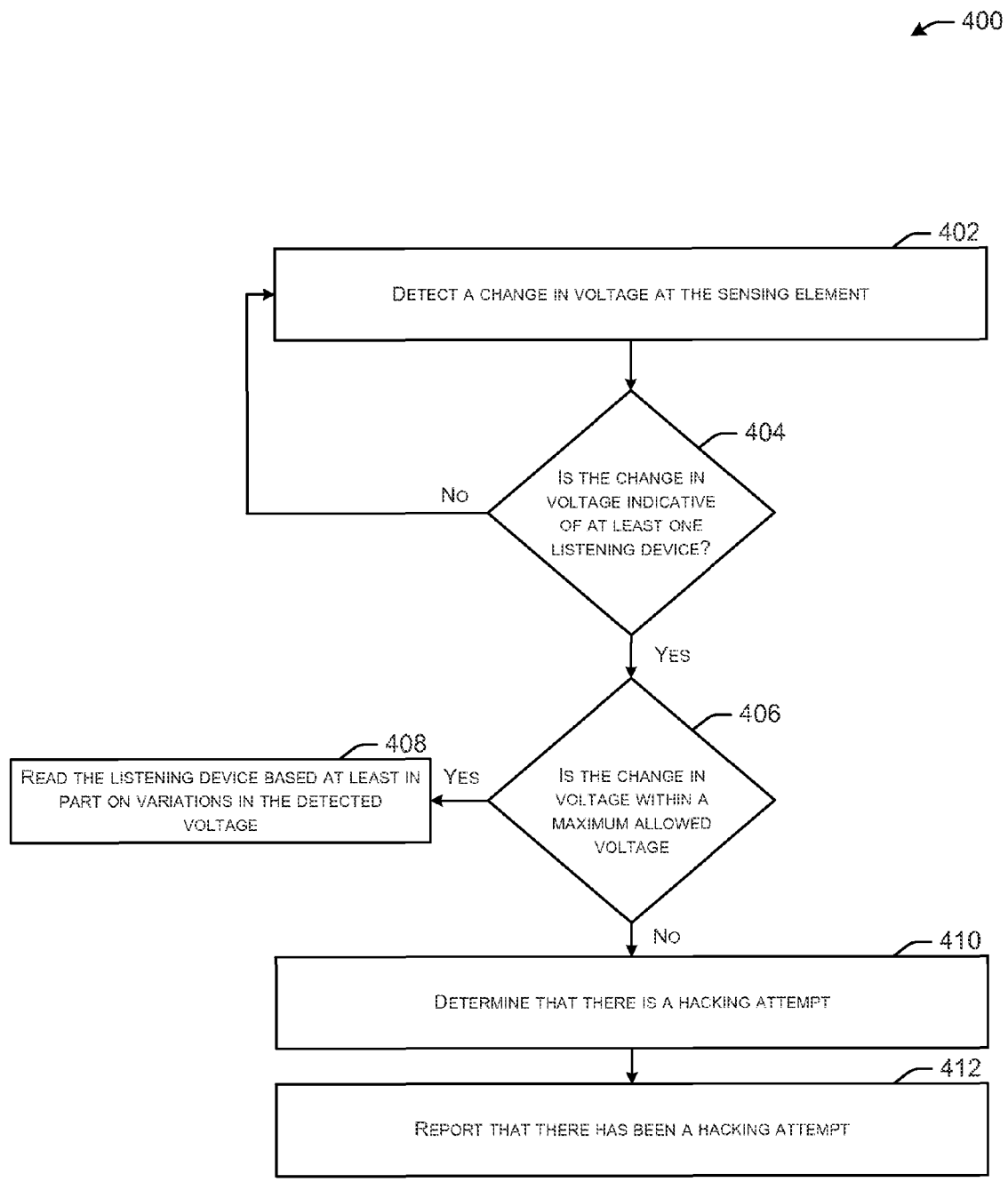
FIG. 4 is a flow diagram illustrating an example method for determining that a hacking attempt has been made based at least in part on detected voltage changes detected by the NFC polling device, in accordance with certain example embodiments of the disclosure.

FIG. 4 is a flow diagram illustrating an example method 400 for determining that a hacking attempt has been made based at least in part on detected voltage changes detected by the polling device 110, in accordance with certain example embodiments of the disclosure. In example embodiments, the method 400 may be performed by the NFC polling device 110 and the processors 300 thereon. At block 402, a change in voltage at the sensing element may be detected. The EM field 140 may be generated by alternating current, such as, in a non-limiting example a 13.56 MHz signal. This oscillating EM field 140 may inductively induce a current in the sensing element 114 of the NFC polling device 110. If a signal is modulated onto the EM field 140, such as by an NFC listening device 120, then that signal may be detected by the NFC polling device 110.

At block 404, it may be determined if the change in voltage is indicative of at least one listening device. It may be determined if the change in voltage is indicative of at least one NFC listening device 120 if the change in voltage is above a minimum threshold level, corresponding to a single NFC listening device 120. If it is determined at block 404 that the change in voltage is not indicative of at least one listening device 120, then the method 400 may return to block 402 to continue to monitor for a change in voltage at the sensing element. This means that there are no listening devices 120 detected in the EM field 140.

If, however, at block 404 it is determined that the change in voltage is indicative of at least one listening device 120, then at block 406, it may be determined if the change in voltage is within a maximum allowed voltage. The maximum allowed voltage may be a predetermined threshold voltage level. This threshold voltage level may be consistent with having at most one NFC listening device 120 within the EM field 140 emitted by the NFC polling device 110. If it is determined at block 406 that the magnitude of the change in voltage is within the maximum allowed voltage (i.e. less than the threshold voltage), then at block 408, the NFC listening device 120 may be read, by the NFC polling device 110, based at least in part on variations in the detected voltage. In this case, the variations in the detected voltage at the sensing element 114 of the NFC polling device 110 may be a result of modulation of bits on to the carrier signal of the EM field 140. Therefore, detecting the variations in the detected voltage and demodulating the signal may provide the data carried by and modulated onto the EM field 140 by the NFC listening device 120.

If, however, at block 406, it is determined that the change in voltage is not within the maximum allowed voltage, then at block 410, it may be determined that there is a hacking attempt. In this case, the detected magnitude of the voltage change at the sensing element 114 of the NFC polling device 110 may be greater than the predetermined threshold level. In example embodiments, the threshold level may be selected such that introducing more than one NFC device into the EM field 140 results in a change in voltage at the sensing element 114 of the NFC polling device 110 that is greater than the predetermined threshold value. In this way, the threshold value may be used as a comparison level to identify when more than one NFC device may be placed in relative proximity of the NFC polling device 120, such as within the EM field 140.

At block 412, the attempted hacking event may be reported. The attempted hacking may be reported to a user device that incorporates the NFC polling device 110. In some example embodiments, the NFC polling device 110 may discontinue reading a listening device when it has been determined that there has been a hacking attempt. In some further example embodiments, the NFC polling device 110 may discontinue emitting the EM field 140 upon detecting the hacking attempt.

It will also be appreciated that in alternative example embodiments, the absolute voltage, rather than the change in voltage, at the sensing element 114 of the NFC polling device 110 may be used to determine if a hacking condition exists and/or a hacking attempt is occurring. In other words, the absolute voltage across the sensing element 114 may be determined at block 402, rather than a change in the voltage across the sensing element 114. In this case, at block 404, the detected voltage across the sensing element 114 may be compared to a threshold voltage level to determine if the the voltage is indicative of at least one NFC listening device 120. Similarly, at block 406, the voltage detected across the sensing element 114 of the NFC polling device 110 may be compared to a respective threshold condition to determine if there is a hacking attempt. For example, at block 406, it may be determined if the detected voltage is less than a threshold voltage level, and if it is less than a threshold voltage level, then it may be determined that there is a hacking attempt underway. The threshold voltage level, in this case, may be one that might be detected at the sensing element 114 of the NFC polling device 110 if the EM field 140 is loaded by more than one NFC device (i.e. the NFC listening device 120 and the NFC hacking device 130).

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
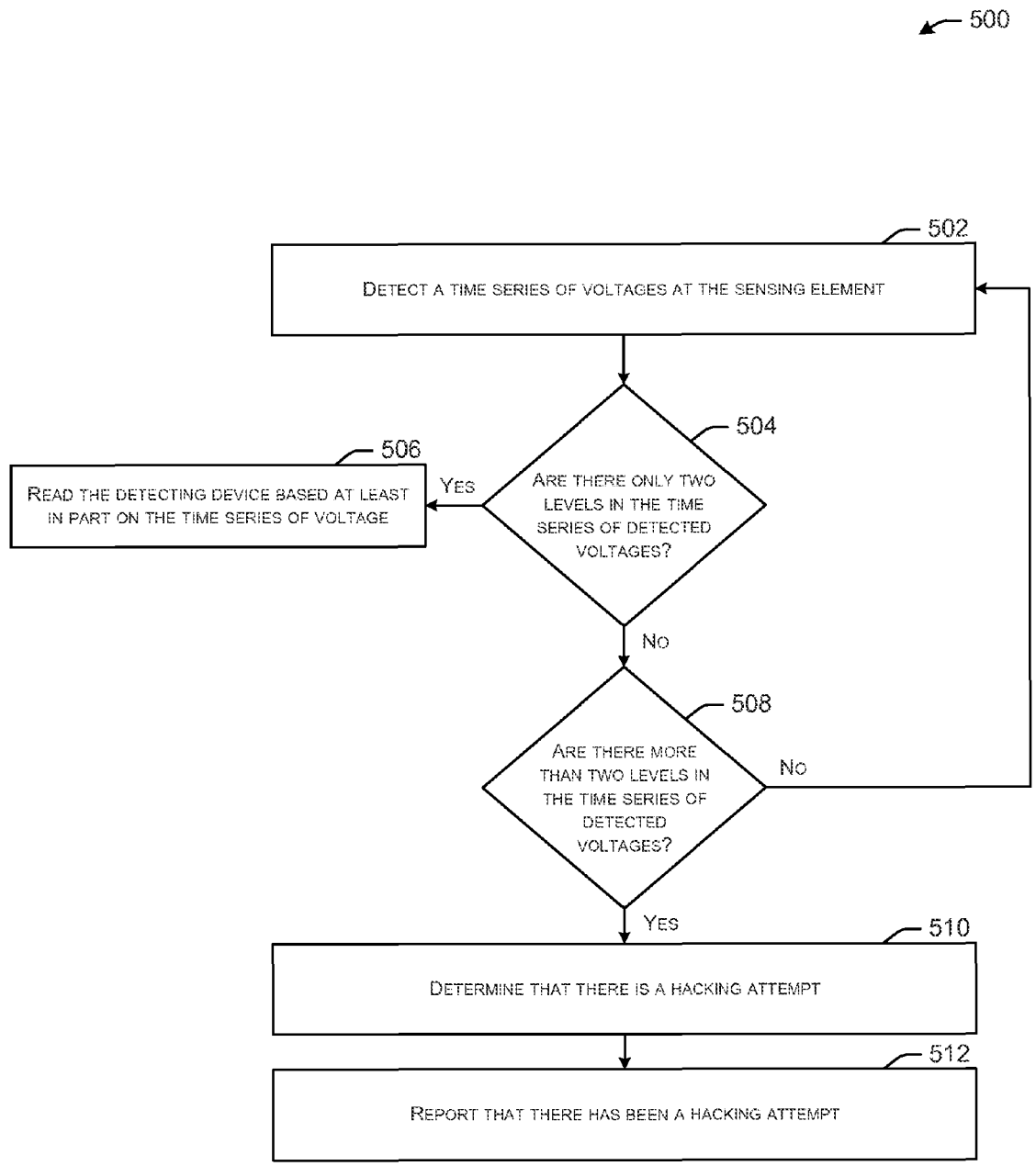
FIG. 5 is a flow diagram illustrating an example method for determining that a hacking attempt has been made based at least in part on detected voltage levels detected by the NFC polling device, in accordance with certain example embodiments of the disclosure.

FIG. 5 is a flow diagram illustrating an example method 500 for determining that a hacking attempt has been made based at least in part on detected voltage levels detected by the polling device 110, in accordance with certain example embodiments of the disclosure. In example embodiments, the method 500 may be performed by the NFC polling device 110 and the processors 300 thereon. At block 502, a time series of voltages may be detected at the sensing element. The time series of voltages may be detected by the processors 300 by sampling the voltage, as detected at the sensing element 114 of the NFC polling device 110. The time series of voltages may be held and/or stored in memory 310 of the NFC polling device 110 and may be correlated to the intensity of the EM field 140 for each sample.

At block 504, it may be determined if there are only two levels in the time series of detected voltages. This may be performed, in some example embodiments, by filtering the relatively small changes in the voltage from the relatively larger changes in the voltage and recording the relatively larger changes in voltage as a separate voltage level within the time series of voltage. The processors 300 may generate a set of separate voltage levels detected in the time series of voltages. In some cases the differences in voltage from one time point to another time point may be compared to a threshold voltage level to determine if the two voltages detected at the two points in time are separate voltage levels. The processors 300 may further determine the cardinality of the set of separate voltage levels. In other words the processors 300 may identify the number of different voltage levels detected. Each of the voltage levels may represent a high or low signal that is modulated onto the EM field 140 by one or more listening device 120.

If it is determined, at block 504, that there are only two levels in the time series of detected voltages, then at block 506, the listening device may be read based at least in part on the time series of voltages. The variations in the detected voltage at the sensing element 114 of the NFC polling device 110 of the time series of voltage may be a result of modulation of bits on to the carrier signal of the EM field 140. Therefore, detecting the variations in the detected voltage within the time series of voltage and demodulating the signal may provide the data carried by and modulated onto the EM field 140 by the NFC listening device 120.

If, however, at block 504, it is determined that there are not only two voltage levels in the time series of detected voltages, then the method 500 may proceed to block 508, where it may be determined whether there are more than two levels in the time series of detected voltages. If it is determined that there are not more than two levels of detected voltages at block 508, then the method 500 may return to block 502 where the time series of voltages may continue to be detected at the sensing element. In this case, the polling device 110 may not have detected the presence of even one listening device based on any detected perturbations in the EM field 140.

If, however, at block 508, it is determined that there are more than two levels in the time series of detected voltages, then at block 510, it may be determined that there is a hacking attempt. In other words, if there are three or more separate voltage levels detected in the time series of voltages detected at the sensing element 114, then it may be determined that there may be a hacking attempt.

At block 512, it may be reported that there has been a hacking attempt. The attempted hacking may be reported to a user device that incorporates the NFC polling device 110. In some example embodiments, the NFC polling device 110 may discontinue reading a listening device when it has been determined that there has been a hacking attempt. In some further example embodiments, the NFC polling device 110 may discontinue emitting the EM field 140 upon detecting the hacking attempt.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure, including the best mode, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The disclosure may include a method. The method may include emitting, by a polling device comprising one or more processors and a sensing element, an electromagnetic field; identifying, by the polling device, a voltage at a first time by sensing electromagnetic field at the first time; identifying, by the polling device, a voltage at a second time by sensing electromagnetic field at the second time; and determining, by the polling device and based at least in part on a change in voltage between the first time and the second time, that there is no attempted hacking event. In example embodiments, determining that there is no attempted hacking event further comprises determining, by the polling device, that a magnitude of a change in the voltage between the first time and second time is less than a predetermined threshold value. The method, in example embodiments, may further include determining, by the polling device and responsive to determining that there is no attempted hacking event, a time series of voltages generated by sensing the electric field at a plurality of sampling times; and demodulating, by the polling device and based at least in part on the time series of voltages, data carried by the electromagnetic field. The method may still further include discontinuing, by the polling device and responsive to determining that there is no attempted hacking event, emitting the electromagnetic field. The method may yet further include identifying, by the polling device, a voltage at a third time by sensing the electromagnetic field at the third time, wherein the third time is subsequent to the second time; and determining, by the polling device and based at least in part on a change in voltage between the first time and the third time, that there is an attempted hacking event at the third time. Example embodiments may further include a system for performing any of these methods.

Example embodiments of the disclosure may include an apparatus comprising a means for emitting an electromagnetic field; a means for identifying a voltage at a first time by sensing the electromagnetic field at the first time; a means for identifying a voltage at a second time by sensing the electromagnetic field at the second time; and a means for determining, based at least in part on the voltage at the first time and the second time, that there is no attempted hacking event. In the apparatus, in example embodiments, the means for determining that there is no attempted hacking event further comprises a means for determining that a magnitude of a change in the voltage between the first time and second time is less than a predetermined threshold value. In further example embodiments, the means for determining that there is no attempted hacking event further comprises a means for determining that the voltage at the second time is less than a predetermined threshold value. In still further embodiments, the apparatus may further include a means for determining, responsive to determining that there is no attempted hacking event, a time series of voltages generated by sensing the electromagnetic field at a plurality of sampling times; and a means for demodulating, based at least in part on the time series of voltages, data carried by the electromagnetic field. The apparatus may yet further include a means for identifying a voltage at a third time by sensing the electromagnetic field at the third time, wherein the third time is subsequent to the second time; and a means for determining, based at least in part on a change in voltage between the first time and the third time, that there is an attempted hacking event at the third time.

Example embodiments of the disclosure may include a system, comprising a sensing element for sensing an electromagnetic field; at least one memory that stores computer-executable instructions; at least one processor configured to access the at least one memory, wherein the at least one processor is configured to execute the computer-executable instructions to emit an electromagnetic field; identify a voltage at a first time by sensing the electromagnetic field at the first time; identify a voltage at a second time by sensing the electromagnetic field at the second time; and determine, based at least in part on a change in voltage between the first time and the second time, that there is an attempted hacking event. In some example embodiments, the at least one processor is configured to execute the computer-executable instructions to determine that there is an attempted hacking event comprises determining, by the polling device, that a magnitude of a change in the voltage between the first time and second time is greater than a predetermined threshold value. In further example embodiments of the system, the at least one processor is configured to further execute the computer-executable instructions to discontinue, responsive to determining that there is an attempted hacking event, emitting the electromagnetic field. Further still, in the system, the at least one processor is configured to further execute the computer-executable instructions to report, responsive to determining that there is attempted hacking event, an indication of the attempted hacking event. In some example embodiments, the at least one processor is configured to further execute the computer-executable instructions to identify a voltage at a third time by sensing the electromagnetic field at the third time, wherein the third time is subsequent to the second time; and determine, based at least in part on a change in voltage between the first time and the third time, that there is no attempted hacking event at the third time. In example embodiments, the at least one processor is configured to determine, that there is no attempted hacking event at the third time by determining that a magnitude of a change in the voltage between the first time and second time is less than a predetermined threshold value. In still further embodiments, in the system, the at least one processor is configured to further execute the computer-executable instructions to determine, responsive to determining that there is no attempted hacking event at the third time, a time series of voltages generated by sensing the electric field at a plurality of sampling times; and demodulate, based at least in part on the time series of voltages, data carried by the electromagnetic field.

Example embodiments may include one or more computer-readable media comprising computer-executable instructions that, when executed by one or more processors, configure the one or more processors to perform a method comprising emitting an electromagnetic field; identifying a voltage at a first time by sensing the electromagnetic field at the first time; identifying a voltage at a second time by sensing the electromagnetic field at the second time; and determining, based at least in part on the voltage at the first time and the second time, that there is an attempted hacking event. In example embodiments, determining that there is an attempted hacking event comprises determining that a magnitude of a change in the voltage between the first time and second time is greater than a predetermined threshold value. In further example embodiments, determining that there is an attempted hacking event comprises determining that the voltage at the second time is less than a predetermined threshold value. In still further example embodiments, the method further comprises discontinuing, responsive to determining that there is an attempted hacking event, emitting the electromagnetic field. In yet further example embodiments, the method further comprises reporting, responsive to determining that there is attempted hacking event, an indication of the attempted hacking event. In example embodiments, the method further comprises identifying a voltage at a third time by sensing the electromagnetic field at the third time, wherein the third time is subsequent to the second time; and determining, based at least in part on a change in voltage between the first time and the third time, that there is no attempted hacking event at the third time.

Example embodiments may include one or more computer-readable media comprising computer-executable instructions that, when executed by one or more processors, configure the one or more processors to perform a method comprising emitting an electric field; determining a time series of voltages generated by sensing the electric field at a plurality of sampling times; analyzing the time series of voltages to identify a set of one or more voltage levels; identifying the cardinality of the set of one or more voltage levels; determining, based at least in part on the cardinality of the set of one or more voltage levels, that there is an attempted hacking event. In example embodiments, determining that there is an attempted hacking event comprises determining that the cardinality of the set of one or more voltage levels is greater than a predetermined threshold level. Further still, in certain example embodiments, with the one or more computer-readable media the predetermined threshold level is 2. In further example embodiments, the one or more computer-readable media may have the method that further comprises discontinuing, responsive to determining that there is an attempted hacking event, emitting the electromagnetic field. The one or more computer-readable media may further have the method comprising reporting, responsive to determining that there is attempted hacking event, an indication of the attempted hacking event. the method further comprising determining a second time series of voltages generated by sensing the electric field at a second plurality of sampling times; analyzing the second time series of voltages to identify a second set of one or more voltage levels; identifying the cardinality of the second set of one or more voltage levels; and determining, based at least in part on the cardinality of the second set of one or more voltage levels, that there is no longer an attempted hacking event. In still further example embodiments, determining that there is an attempted hacking event comprises determining that the cardinality of the second set of one or more voltage levels is not greater than the predetermined threshold level.

Example embodiments may include a method comprising emitting, by a polling device comprising one or more processors, an electric field; determining, by the polling device, a time series of voltages generated by sensing the electric field at a plurality of sampling times; analyzing, by the polling device, the time series of voltages to identify a set of one or more voltage levels; identifying, by the polling device, the cardinality of the set of one or more voltage levels; and determining, by the polling device and based at least in part on the cardinality of the set of one or more voltage levels, that there is no attempted hacking event. In example embodiments, determining that there is no attempted hacking event comprises determining, by the polling device, that the cardinality of the set of one or more voltage levels is not greater than a predetermined threshold level. In further example embodiments, the method may further include determining, by the polling device, a second time series of voltages generated by sensing the electric field at a second plurality of sampling times; analyzing, by the polling device, the second time series of voltages to identify a second set of one or more voltage levels; identifying, by the polling device, the cardinality of the second set of one or more voltage levels; and determining, by the polling device based at least in part on the cardinality of the second set of one or more voltage levels, that there is an attempted hacking event. Example embodiments may further include a system for performing any of these methods.

The disclosure may further include a system. The system may include a sensing element for sensing an electromagnetic field; at least one memory that stores computer-executable instructions; at least one processor configured to access the at least one memory, wherein the at least one processor is configured to execute the computer-executable instructions to emit an electric field; determine a time series of voltages generated by sensing the electric field at a plurality of sampling times; analyze the time series of voltages to identify a set of one or more voltage levels; identify the cardinality of the set of one or more voltage levels; and determine, based at least in part on the cardinality of the set of one or more voltage levels, that there is no attempted hacking event. In example embodiments, the at least one processor is configured to execute the computer-executable instructions to determine that there is no attempted hacking event by determining that the cardinality of the set of one or more voltage levels is not greater than a predetermined threshold level. In still further example embodiments, the at least one processor is further configured to execute the computer-executable instructions to determine a second time series of voltages generated by sensing the electric field at a second plurality of sampling times; analyze the second time series of voltages to identify a second set of one or more voltage levels; identify the cardinality of the second set of one or more voltage levels; and determine, based at least in part on the cardinality of the second set of one or more voltage levels, that there is an attempted hacking event.

The claimed invention is:

1. A method, comprising:
   emitting, by a polling device comprising one or more processors, an electromagnetic field;
   identifying, by the polling device, a voltage at a first time by sensing the electromagnetic field at the first time by a sensing element;
   identifying, by the polling device, a voltage at a second time by sensing the electromagnetic field at the second time by the sensing element; and
   determining, by the polling device and based at least in part on the voltage at the first time and the second time, that there is no attempted hacking event.

2. The method of claim 1, wherein determining that there is no attempted hacking event further comprises determining, by the polling device, that a magnitude of a change in the voltage between the first time and second time is less than a predetermined threshold value.

3. The method of claim 1, wherein determining that there is no attempted hacking event further comprises determining, by the polling device, that the voltage at the second time is less than a predetermined threshold value.

4. The method of claim 1, further comprising:
   determining, by the polling device and responsive to determining that there is no attempted hacking event, a time series of voltages generated by sensing the electromagnetic field at a plurality of sampling times; and
   demodulating, by the polling device and based at least in part on the time series of voltages, data carried by the electromagnetic field.

5. The method of claim 1, further comprising:
   identifying, by the polling device, a voltage at a third time by sensing the electromagnetic field at the third time, wherein the third time is subsequent to the second time; and
   determining, by the polling device and based at least in part on a change in voltage between the first time and the third time, that there is an attempted hacking event at the third time.

6. A system, comprising:
   a sensing element for sensing an electromagnetic field;
   at least one memory that stores computer-executable instructions;
   at least one processor configured to access the at least one memory, wherein the at least one processor is configured to execute the computer-executable instructions to:
   emit an electromagnetic field;
   identify a voltage at a first time by sensing the electromagnetic field at the first time;
   identify a voltage at a second time by sensing the electromagnetic field at the second time; and
   determine, based at least in part on the voltage at the first time and the second time, that there is an attempted hacking event.

7. The system of claim 6, wherein the at least one processor is configured to execute the computer-executable instructions to determine that there is an attempted hacking event comprises determining that a magnitude of a change in the voltage between the first time and second time is greater than a predetermined threshold value.

8. The system of claim 6, wherein the at least one processor is configured to execute the computer-executable instructions to determine that there is an attempted hacking event comprises determining that the voltage at the second time is less than a predetermined threshold value.

9. The system of claim 6, wherein the at least one processor is configured to further execute the computer-executable instructions to discontinue, responsive to determining that there is an attempted hacking event, emitting the electromagnetic field.

10. The system of claim 6, wherein the at least one processor is configured to further execute the computer-executable instructions to report, responsive to determining that there is attempted hacking event, an indication of the attempted hacking event.

11. The system of claim 6, wherein the at least one processor is configured to further execute the computer-executable instructions to:
    identify a voltage at a third time by sensing the electromagnetic field at the third time, wherein the third time is subsequent to the second time; and
    determine, based at least in part on a change in voltage between the first time and the third time, that there is no attempted hacking event at the third time.

12. The system of claim 11, wherein the at least one processor is configured to determine, that there is no attempted hacking event at the third time by determining that a magnitude of a change in the voltage between the first time and second time is less than a predetermined threshold value.

13. The system of claim 11, wherein the at least one processor is configured to further execute the computer-executable instructions to:
    determine, responsive to determining that there is no attempted hacking event at the third time, a time series of voltages generated by sensing the electric field at a plurality of sampling times; and
    demodulate, based at least in part on the time series of voltages, data carried by the electromagnetic field.

14. One or more non-transitory computer-readable media comprising computer-executable instructions that, when executed by one or more processors, configure the one or more processors to perform a method comprising:
    emitting an electromagnetic field;
    determining a time series of a magnitude of a signal corresponding to the electromagnetic field sensed at a plurality of sampling times;
    analyzing the time series of the magnitude of the signal to identify a set of one or more signal levels;
    identifying the cardinality of the set of one or more signal levels; and
    determining, based at least in part on the cardinality of the set of one or more signal levels, that there is an attempted hacking event.

15. The one or more non-transitory computer-readable media of claim 14, wherein determining that there is an attempted hacking event comprises determining that the cardinality of the set of one or more signal levels is greater than a predetermined threshold level.

16. The one or more non-transitory computer-readable media of claim 15, wherein the predetermined threshold level is 2.

17. The one or more non-transitory computer-readable media of claim 14, wherein the method further comprises discontinuing, responsive to determining that there is an attempted hacking event, emitting the electromagnetic field.

18. The one or more non-transitory computer-readable media of claim 14, wherein the method further comprises reporting, responsive to determining that there is attempted hacking event, an indication of the attempted hacking event.

19. The one or more non-transitory computer-readable media of claim 14, wherein the method further comprises:
   determining a second time series of a magnitude of a signal corresponding to the electromagnetic field sensed at a second plurality of sampling times;
   analyzing the second time series of voltages to identify a second set of one or more signal levels;
   identifying the cardinality of the second set of one or more signal levels; and
   determining, based at least in part on the cardinality of the second set of one or more signal levels, that there is no longer an attempted hacking event.

20. The one or more non-transitory computer-readable media of claim 19, wherein determining that there is an attempted hacking event comprises determining that the cardinality of the second set of one or more signal levels is not greater than the predetermined threshold level.

21. A system, comprising:
   a sensing element for sensing an electromagnetic field;
   at least one memory that stores computer-executable instructions;
   at least one processor configured to access the at least one memory, wherein the at least one processor is configured to execute the computer-executable instructions to:
   emit an electric field;
   determine a time series of voltages generated by sensing the electric field at a plurality of sampling times;
   analyze the time series of voltages to identify a set of one or more voltage levels;
   identify the cardinality of the set of one or more voltage levels; and
   determine, based at least in part on the cardinality of the set of one or more voltage levels, that there is no attempted hacking event.

22. The system of claim 21, wherein the at least one processor is configured to execute the computer-executable instructions to determine that there is no attempted hacking event by determining that the cardinality of the set of one or more voltage levels is not greater than a predetermined threshold level.

23. The system of claim 21, wherein the at least one processor is further configured to execute the computer-executable instructions to:
   determine a second time series of voltages generated by sensing the electric field at a second plurality of sampling times;
   analyze the second time series of voltages to identify a second set of one or more voltage levels;
   identify the cardinality of the second set of one or more voltage levels; and
   determine, based at least in part on the cardinality of the second set of one or more voltage levels, that there is an attempted hacking event.

* * * * *